US005878566A

United States Patent [19]

Endo et al.

[11] Patent Number: 5,878,566

[45] Date of Patent: Mar. 9, 1999

[54] GAS TURBINE AND A GAS TURBINE CONTROL METHOD

[75] Inventors: Tomoyoshi Endo; Fumiyuki Hirose; Akira Shimura, all of Hitachi; Takumi Yamanobe, Takahagi; Isao Sato, Hitachi; Hiraku Ikeda, Hitachinaka, all of Japan

[73] Assignee: Hitachi, Ltd., Tokyo, Japan

[21] Appl. No.: 976,362

[22] Filed: Oct. 21, 1997

Related U.S. Application Data

[63] Continuation of Ser. No. 566,892, Dec. 4, 1995, abandoned.

[30] Foreign Application Priority Data

Dec. 5, 1994 [JP] Japan .................................... 6-300597

[51] Int. Cl.[6] ........................................ F02C 9/28

[52] U.S. Cl. ........................ 60/39.03; 60/39.281; 60/747

[58] Field of Search ............................ 60/39.03, 39.27, 60/39.281, 733, 746, 747

[56] References Cited

U.S. PATENT DOCUMENTS 5,024,055 6/1991 Sato .................................... 60/39.281

5,327,718 7/1994 Iwata .................................... 60/39.27

5,533,329 7/1996 Ohyama ................................ 60/39.27

FOREIGN PATENT DOCUMENTS 2-86927 3/1990 Japan .

*Primary Examiner*—Louis J. Casaregola

*Attorney, Agent, or Firm*—Fay, Sharpe, Beall, Fagan, Minnich & McKee

[57] ABSTRACT

A control method of a gas turbine which is provided with a multi can type combustor consisting of a plurality of unit combustors, each of which has a first stage combustion section for diffusion combustion and a second stage combustion section for premix combustion. Combustion states in the first and second stage combustion sections are monitored to take in quantities representative of the combustion conditions as control factors. The combustion in the second stage combustion section is assumed to be abnormal when the taken in quantities exceed an allowable limit and the combustion in the first and second stage combustion sections is changed to independent combustion only in the first stage combustion section when the number of unit combustors, each of which is assumed to be abnormal, exceeds a predetermined number of the unit combustors.

8 Claims, 7 Drawing Sheets

GAS TURBINE AND A GAS TURBINE CONTROL METHOD

This is a continuation application of Ser. No. 08/566,892, filed Dec. 4, 1995 (abandoned).

BACKGROUND OF THE INVENTION

The present invention relates to a gas turbine having two-stage combustion type combustors of multi-can type and a control method of the gas turbine, and, more particularly, to a method of controlling combustion effected simultaneously in a plurality of unit combustors so as to avoid unstable combustion.

A conventional gas turbine having two-stage combustion type combustors is shown in FIG. 5. The combustor comprises a plurality of unit combustors. Each of the unit combustors has a first stage combustion section 28 for effecting diffusion combustion and a second stage combustion section 13 for effecting premixed combustion. One of features of this kind of gas turbine combustor is in that a fuel air ratio, that is, a ratio between fuel and air can be changed in a wide range from an operation at starting to a rated load operation.

The gas turbine having two-stage combustion type combustors can achieve low NOx combustion even in a wide range of fuel air ratio, which is achieved by combustion control in the first stage combustion section 28 and in the second stage combustion section 13. In the first stage combustion section 28, diffusion combustion is effected which is wide in working range from an operation at starting to an operation at rated load. That is, first, combustion is effected only in the first stage combustion section 28, the combustion then is changed to simultaneous combustion that is effected simultaneously in the first and second stage combustion sections 28 and 13, and thereafter the combustion is effected mainly in the second stage combustion section 13.

In the second stage combustion section 13, premix combustion is employed in which combustion air 29 and fuel 31 from a fuel nozzle 30 are premixed in swirl vanes 14 and then premixed fuel air is burnt downstream of the swirl vanes 14 to reduce NOx production even in a high load range.

Outlet air 25 from a compressor 24 is introduced into each of the unit combustors 12 and then flowed into a gas turbine section 27 as exhaust gas 26. Flow rate control of combustion air 29 for the second stage combustion section 13 is executed by an air flow control device 32 according to a fuel flow rate.

As for the diffusion combustion, since an amount of air necessary to effect stable combustion of injected fuel can be used and remaining air also can be used for dilution, NOx concentration is dull to fuel air ratio and the diffusion combustion can be effected in a wide range of fuel air ratio. However, even if much air exists in the surrounding, there is a limit to reduction of NOx production only by the diffusion combustion, so that the second stage combustion section 13 employing premix combustion is necessary.

FIG. 6 shows a relationship between fuel air ratio and NOx concentration or CO concentration in the second stage combustion section employing premix combustion. As shown in FIG. 6, there is a range 35 of fuel air ratio in which both NOx concentration 33 and CO concentration 34 are low. That is, when fuel air ratio is adjusted to be within the above-mentioned ratio 35, stable and low NOx combustion can be effected.

In case a premix combustion system shown at the swirl vanes 14 of FIG. 5 is employed in the second stage combustion section 13 to realize the combustion, fuel and air mix well, whereby a fuel air ratio can be lowered and the lowered fuel air ratio makes it possible to lower flame temperature and reduce NOx concentration.

However, combustion changes finely by a difference of a combustor itself, a change in temperature or humidity of combustion air, or change in calorific amount or components of fuel. In particular, in case a gas turbine is provided with a multi can type combustor consisting of a plurality of unit combustors, the combustion states of the unit combustors are different from one another, so that stable combustion may not be effected.

The concentration of NOx generated by combustion is sensitive to a ratio of fuel air supplied for the combustion, and a stable combustion range is narrow, so that it is necessary to finely control the fuel air ratio. Further, flow rate control of the combustion air 29 at time of premix combustion is executed by the air flow control device 32 according to a fuel flow rate, as mentioned above.

Here, conditions of mounting of the unit combustors on the gas turbine will be explained, referring to FIGS. 7, 8, 9. As shown in FIG. 7, the unit combustors 12 are mounted on a left end of the gas turbine and a exhaust portion 36 is at a right end. As is apparent from FIG. 8, a plurality of the unit combustors 12 are arranged on the peripheral portion of the gas turbine body at regular intervals in the peripheral direction. Each of the plurality of unit combustors 12 is provided with an air flow control device. The air flow control devices control simultaneously or individually all the unit combustors, however, combustion conditions are apt to be influenced by influence difference of the combustors themselves, etc to become unstable.

For the above-mentioned reasons, in some cases, even if a secondary fuel which is fuel for the second stage combustion section were injected into the second stage combustion section, fire could not be transmitted from the first stage combustion section to the second stage combustion section not to fire the secondary fuel, or the second stage combustion section was misfired. In such cases, the secondary fuel is exhausted without being burnt, so that the efficiency of combustion is lowered drastically. For preventing such a large decrease in the efficiency, there may be used measured results of temperature distribution, using thermocouples 37 mounted circumferentially on the exhaust portion 36, as shown in FIG. 9, for measuring exhaust gas temperature.

FIG. 10 shows a graph of measurement results of temperature distribution. A normal temperature distribution under which each unit combustor works normally is represented by a curve 38, while a temperature distribution at abnormal time under which some of the unit combustors are in unstable combustion is represented by a curve 39. Under the temperature distribution 39 at an abnormal time, a partial decrease in the exhaust gas temperature appears, so that judgement of abnormal conditions of the unit combustors may be executed monitoring the temperature distribution. A curve 40 represents a temperature distribution under which all the unit combustors are simultaneously abnormal.

A conventional method of controlling a gas turbine is disclosed in JP A 2-86927 (1990), in which the gas turbine is continuously worked even if a thermocouple as a monitoring device becomes out of order.

SUMMARY OF THE INVENTION

Since it is necessary to control a fuel air ratio within a very small range in a second stage combustion section of a premix combustion type in a gas turbine having a two-stage combustion type and a multi can type combustor consisting of a plurality of unit combustors, the control is apt to be unstable and incomplete combustion is likely to occur. Further, when unstable combustion takes place simultaneously in all the unit combustors, as shown by the temperature distribution 40, it is difficult to detect the conditions and it is difficult to continue to operate the gas turbine under such conditions.

The present invention is made in consideration of this problem and an object of the present invention is to provide a gas turbine and a gas turbine control method, which is able to continue operation thereof even if abnormal combustion occurs simultaneously in second stage combustion sections of lots of unit combustors.

Namely, the present invention is characterized in that in a control method of a gas turbine provided with a multi can type combustor consisting of a plurality of unit combustors each of which has a first stage combustion section for diffusion combustion and a second stage combustion section for premix combustion, combustion states in the above-mentioned combustion sections are monitored to obtain monitored values and the combustion in the first and second stage combustion sections is changed to independent combustion only in the first stage combustion section when a quantity representative of the combustion state or condition obtained from the monitored values exceeds an allowable limit and the number of unit combustors each of which exceeds the allowable limit exceeds a prescribed or predetermined number of the unit combustors.

Further, a control method of a gas turbine provided with a multi can type combustor consisting of a plurality of unit combustors, each of which has a first stage combustion section for diffusion combustion and a second stage combustion section for premix combustion is characterized in that the combustion state in the above-mentioned first and second stage combustion sections is monitored, a quantity representative of the combustion state is taken in as a control factor, the combustion in the above-mentioned second stage combustion section is assumed to be abnormal when the taken quantity exceeds an allowable limit, and the combustion in the first and second stage combustion sections is changed to independent combustion only in the first stage combustion section when the number of unit combustors, each of which is assumed to be in abnormal combustion, exceeds a prescribed number of the unit combustors. A second feature of the present invention is in that the above-mentioned quantity representative of the combustion state is at least one of exhaust gas temperature and combustor metal temperature.

A third feature of the present invention is that the above-mentioned quantity of state is a change ratio of at least one of the exhaust gas temperature and the combustor metal temperature.

A fourth feature of the present invention is that the above-mentioned quantity of state is a change rate of at least one of exhaust gas temperature and combustor metal temperature which is monitored continuously or periodically, the above-mentioned allowable limit is a case that the above-mentioned change rate exceeds a prescribed value and the change rate or change amount is above the prescribed value after it has passed for a prescribed period of time. The above-mentioned change amount may be a prescribed change amount of temperature from a temperature in a steady state. Alternatively, the difference between a temperature at time of starting of the prescribed period of time and a temperature after it has passed for the prescribed period of time may be taken.

A fifth feature of the present invention is that the above-mentioned number is half or more of the total number of the unit combustors provided in the gas turbine. As the prescribed number, the number of unit combustors, each of which is in abnormal combustion, which is judged to be unfavorable to continue diffusion combustion as the gas turbine, may be used for example.

As other examples of the prescribed number, the number of half of the total number of the unit combustors may be used as a reference number. Further, the number of from ⅓ or more of the total number of the unit combustors to the number to half of the total number of the unit combustors may be used as a reference number. Using this reference number, misfire in all the unit combustors can be judged a early stage.

A sixth feature of the present invention is in that at least one of exhaust gas temperature and combustor metal temperature in the second stage combustion section is monitored, a change ratio of the temperature is calculated from the monitored values and fuel supply to the second stage combustion section is stopped when the change rate exceeds an allowable limit.

A seventh feature of the present invention is that in a gas turbine apparatus provided with a multi can type combustor consisting of a plurality of unit combustors each of which has a first stage combustion section for diffusion combustion and a second stage combustion section for premix combustion, at least one of an exhaust gas temperature detector and a combustor metal temperature detector in each of the above-mentioned second stage combustion sections, and a controller is provided for calculating the above-mentioned change rate of temperature on the basis of signal from the detector and stopping fuel supply to the second stage combustion section when the change rate exceeds an allowable limit.

An eighth feature of the present invention is in that at least one of an exhaust gas temperature detector and a combustor metal temperature detector in each of the above-mentioned second stage combustion sections, and a controller is provided for calculating the above-mentioned change rate of temperature on the basis of signals from the detector and stopping fuel supply to the second stage combustion section when the change rate exceeds an allowable limit and the number of the unit combustors in each of which the change rate of temperature exceeds the allowable limit exceeds a prescribed number.

In the gas turbine control method as mentioned above, at least one of exhaust gas temperature and combustor metal temperature is measured by a plurality of thermocouples, for instance, to obtain a quantity of state of unstable combustion, and the combustion can be changed promptly to independent combustion in the first stage combustion section even when abnormal combustion occurs simultaneously in the second stage combustion sections of lots of the unit combustors, so that it is possible to continue an operation of the gas turbine without abruptly changing the combustion state.

By the second feature of the present invention, influence by misfire etc. in the combustion section can be detected directly.

According to the third feature of the present invention, by employing a case that a quantity of state of unstable combustion in the second stage combustion section is taken not as variation of measured temperature but as a change rate and the change rate exceeds an allowable change rate, it is surely detected that abnormal combustion occurs simultaneously in the second stage combustion sections of lots of the unit combustors. Further, it is possible to prevent lowering of control preciseness due to a cause other than the combustor such as abnormality of the detector itself, etc. and to raise control performance.

According to the fourth feature of the present invention, a quantity of state of unstable combustion in the combustion sections is not variation in measured temperature but a change rate, the change rate exceeds a prescribed value and the change rate or change amount is above the prescribed value after passage of a prescribed time length, simultaneous lots occurrence of abnormal combustion in the second stage combustion sections of the combustor can be surely detected. Further, the method can be adapted when the condition that the change rate exceeds the allowable change rate lapses for a prescribed time or when the change rate changes abruptly. Further, it is possible to control lowering of control preciseness caused by a cause other than a cause in the combustor such as abnormality of a detector itself, whereby control performance can be improved further. For example, not periodical change in combustion temperature but only temperature change due to misfire can be detected precisely.

According to the fifth, a suitable countermeasure can be taken even if all the unit combustors fall into misfire conditions.

According to the sixth feature of the present invention, occurrence of abnormal combustion in the second stage combustion sections of the gas turbine combustor can be surely detected. It is possible to control lowering of control preciseness caused by a cause other than a cause by the combustor such as abnormality of a detector itself, whereby control performance can be improved.

According to the eighth feature of the present invention, a quantity of state of unstable combustion in the combustion sections is not variation in measured temperature but a change rate above a prescribed value after passage of a prescribed time length, whereby simultaneous occurrence of abnormal combustion in the second stage combustion sections of lots of the unit combustors can be surely detected. Further, it is possible to control lowering of control preciseness caused by a cause other than a cause in the combustor such as abnormality of a detector itself, whereby control performance can be improved further. For example, not periodical change in combustion temperature but only temperature change due to misfire can be detected precisely.

According to the present invention, it is possible to prevent large efficiency lowering caused by exhausting secondary fuel without burning in case where even if the secondary fuel which is fuel for the second stage combustion section is injected into the second stage combustion section, fire can not be transferred from the first stage combustion section to the second stage combustion section for the secondary fuel, or the second stage combustion section is misfired.

In FIG. 10, there is shown a temperature distribution 39 which is in case exhaust gas temperature is measured by a plurality of thermocouples (n) corresponding to a plurality of unit combustors (n) and some of the plurality of unit combustors are in unstable combustion. Namely, deviation in the exhaust gas temperature is caused by the unstable combustion of the unit combustors.

As shown in FIG. 10, in a method of detecting abnormality by monitoring deviation of exhaust gas temperature as a monitoring method of a combustion state, it is possible to detect abnormality in one or two or so unit combustors, however, it is difficult to detect abnormality occurred simultaneously in all the unit combustors as shown by the temperature distribution 40, and it was difficult to continue an operation of the gas turbine under such conditions. According to the present invention, it is possible to continue an operation of the gas turbine while maintaining stable combustion without stopping the operation of the gas turbine by detecting promptly abnormality in combustion and transferring the combustion to independent combustion only in the first stage combustion sections even when abnormal combustion occurs simultaneously in the second stage combustion sections of a lot of combustors.

DESCRIPTION OF THE PREFERRED EMBODIMENTS

Figure 1:
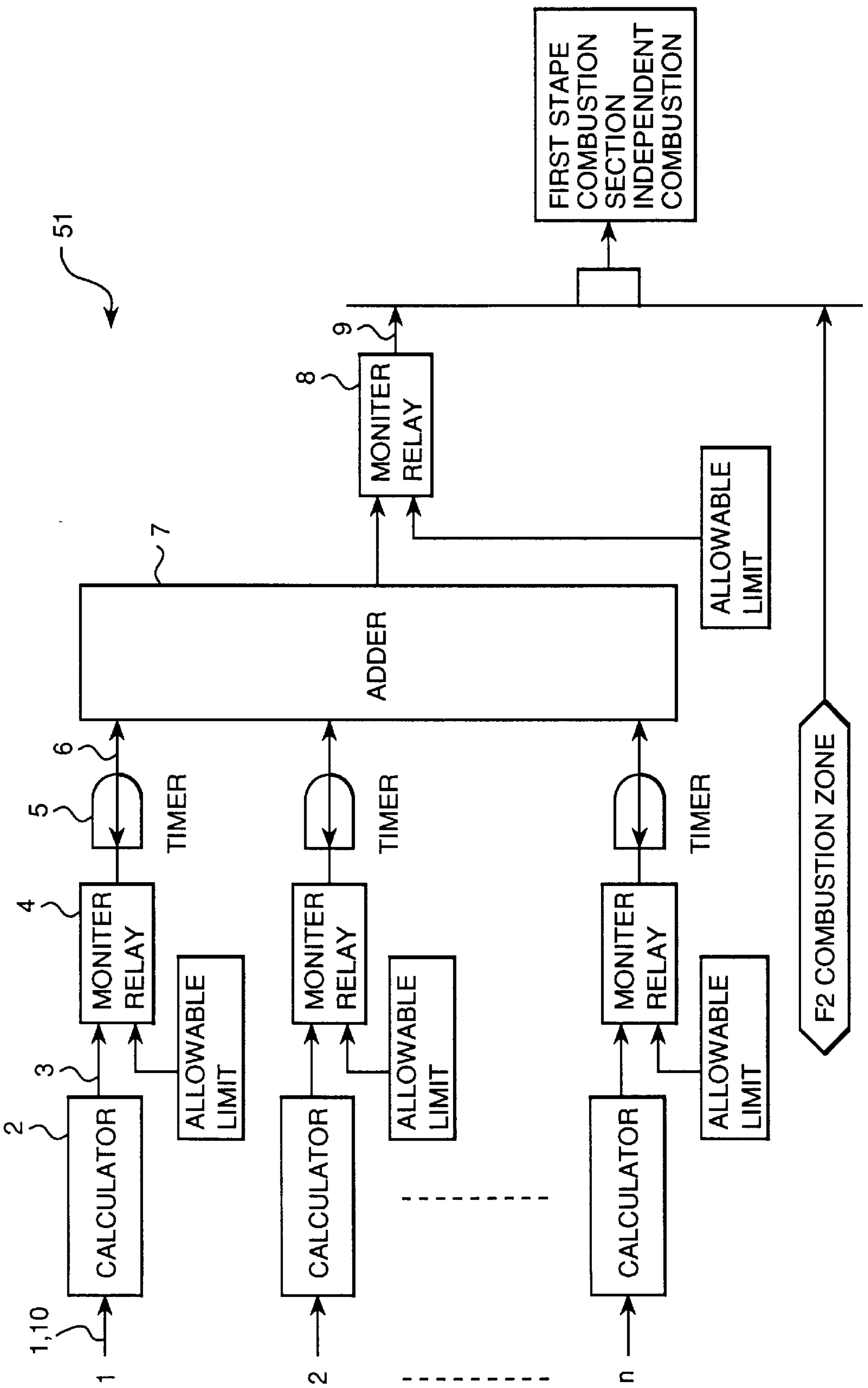
FIG. 1 is a block diagram of a control apparatus of a gas turbine for explaining an embodiment of a control method thereof of the present invention.
Figure 2:
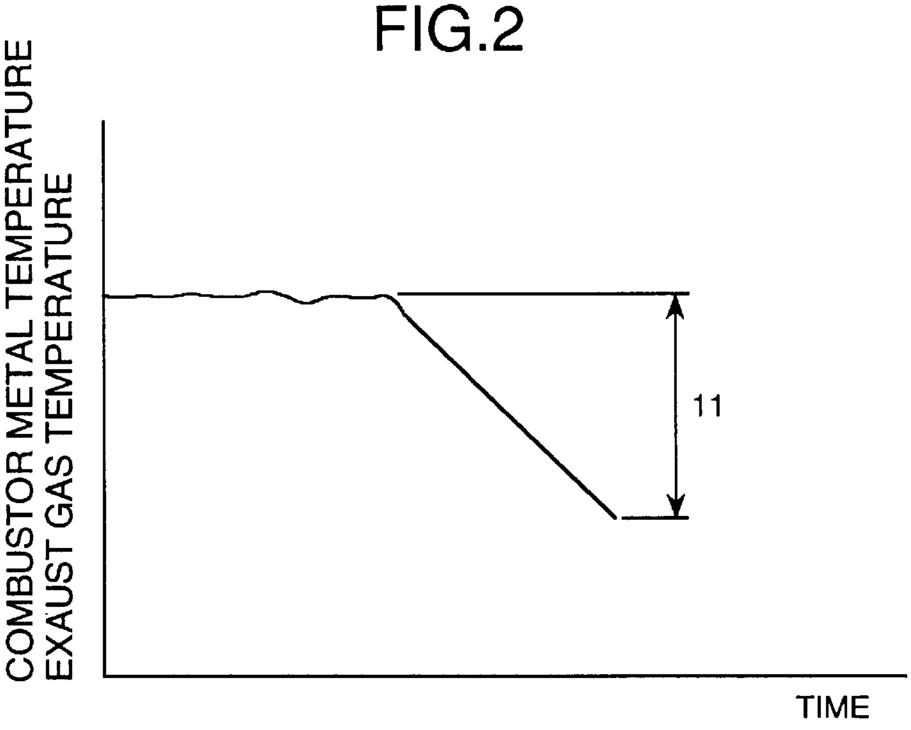
FIG. 2 is a characteristic diagram representative of exhaust gas temperature and combustor metal temperature in a combustor.
Figure 3:
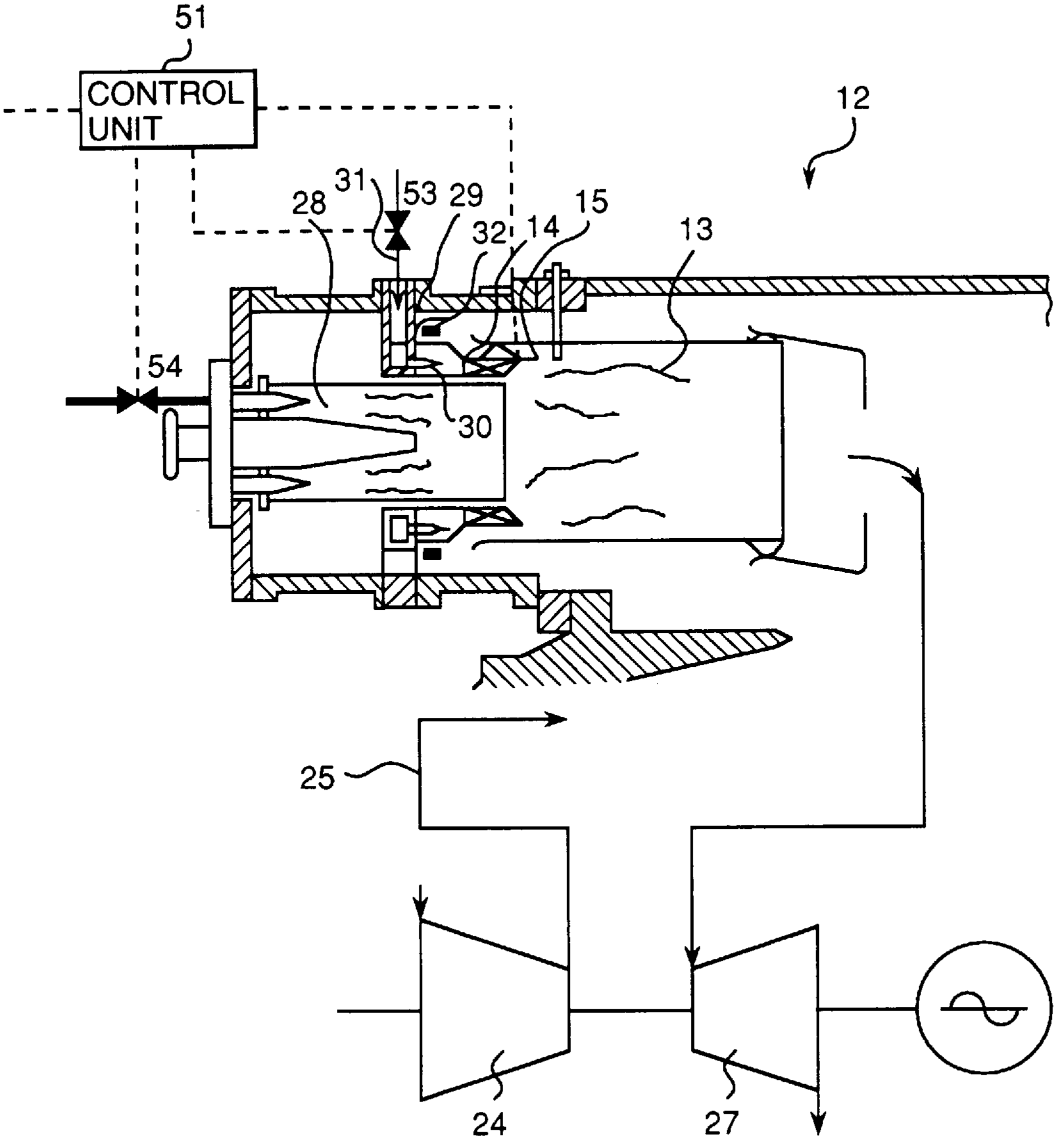
FIG. 3 is a schematic diagram of an embodiment of a gas turbine employing the control system according to the present invention as shown in FIG. 1.

An embodiment of a gas turbine of the present invention is described hereunder, referring to FIGS. 1, 2 and 3.

Figure 5:
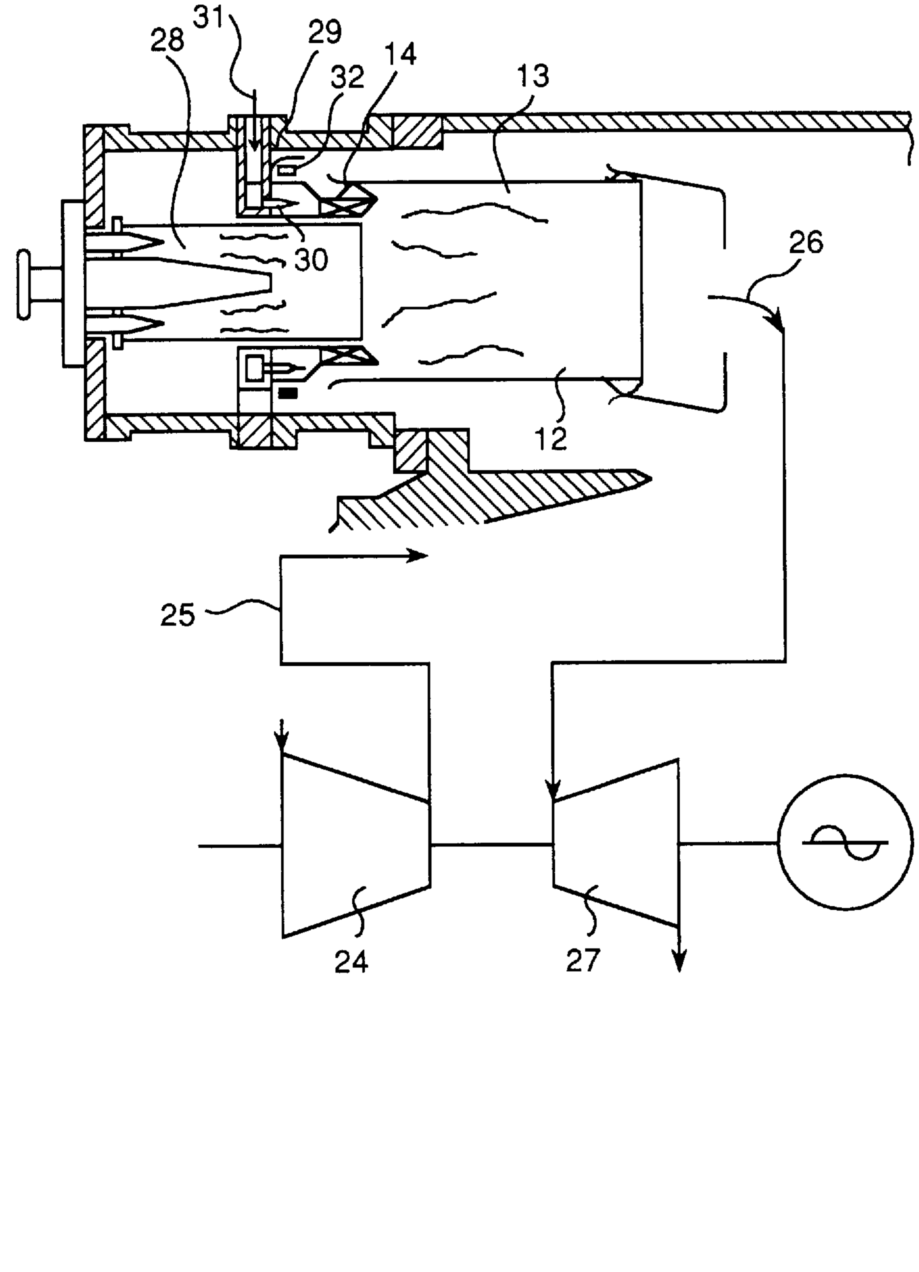
FIG. 5 is a schematic diagram of a conventional gas turbine having a two stage combustion type combustor.
Figure 6:
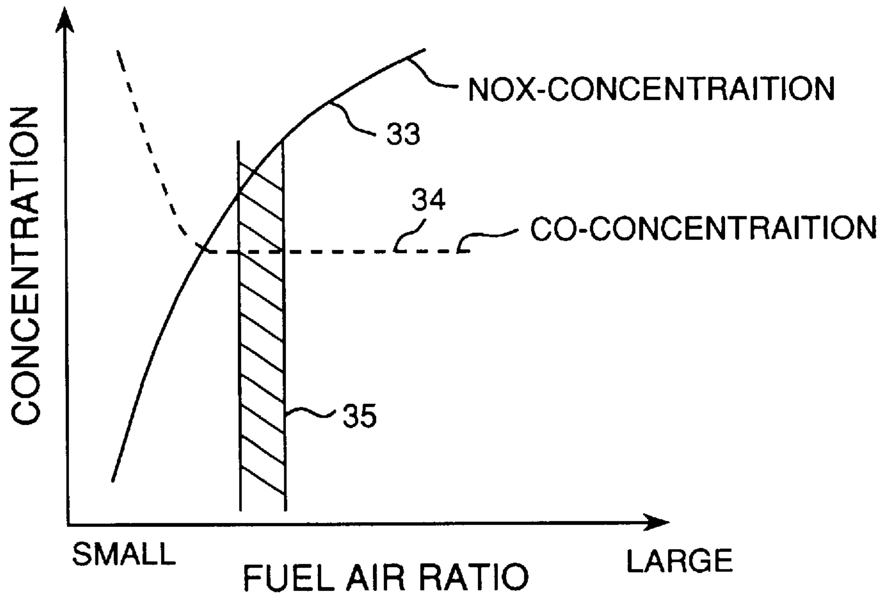
FIG. 6 is a graph representative of a relationship between fuel air ratio and NOx concentration or CO concentration.

In FIG. 3, a gas turbine having a two stage combustion type and multi can type combustor 12 and a control system including control unit 51, fuel control valves 53, 54 and temperature detectors or sensors 15 is shown. The gas turbine is the same as in FIG. 5 except for the control system. Here, the same parts are given the same reference numbers and the detailed explanation of some of them is omitted.

The combustor 12 of multi can-type consists of a plurality of unit or individual combustors, one of which is shown in FIG. 3. Each of the unit combustors comprises a first stage combustion section 28 and a second stage combustion section 13. The first stage combustion section 28 has a plurality of fuel nozzles arranged annularly in an upstream side and diffusion combustion is effected there of fuel injected from the nozzles. The second stage combustion section 13 has at an upstream side a plurality of fuel nozzles 30 and swirl vanes 14. The swirl vanes 14 mix fuel from the nozzles and combustion air having passed through an air flow control device 32 to form premixed fuel air, whereby premix combustion is effected at a downstream side of the swirl vanes 14.

Each unit combustor 12 is provided with a thermocouple 15 as a combustor metal temperature sensor, disposed at a downstream end of the swirl vane to measure combustor metal temperature. The control unit 51 is electrically connected to the thermocouple 15 to take in signals 1 representative of combustor metal temperature. The control unit 51 also is connected to the fuel control valve 53 for controlling fuel flow into the second stage combustion section 13 and the fuel control valve 54 for controlling fuel flow into the first stage combustion section 28.

Figure 7:
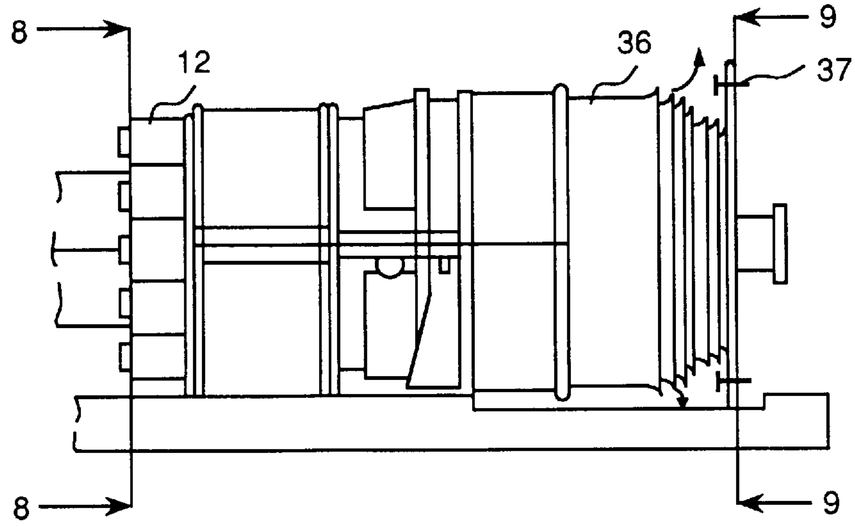
FIG. 7 is a side view of a gas turbine for explanation of mounting of a combustor.
Figure 8:
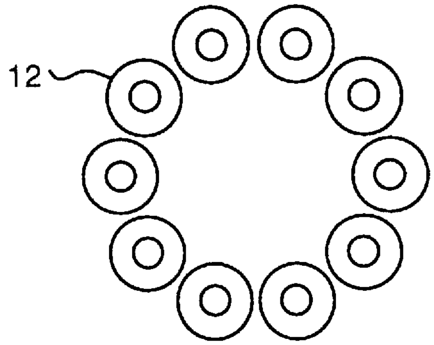
FIG. 8 is a front view viewed from a line 8—8 of FIG. 7.
Figure 9:
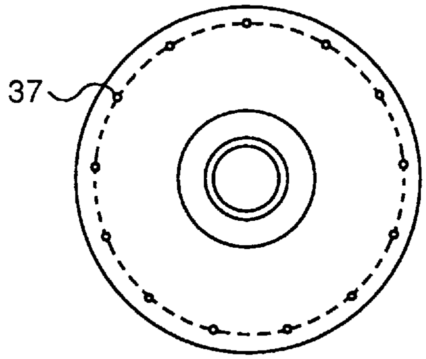
FIG. 9 is a view viewed from a line 9—9 of FIG. 7.
Figure 10:
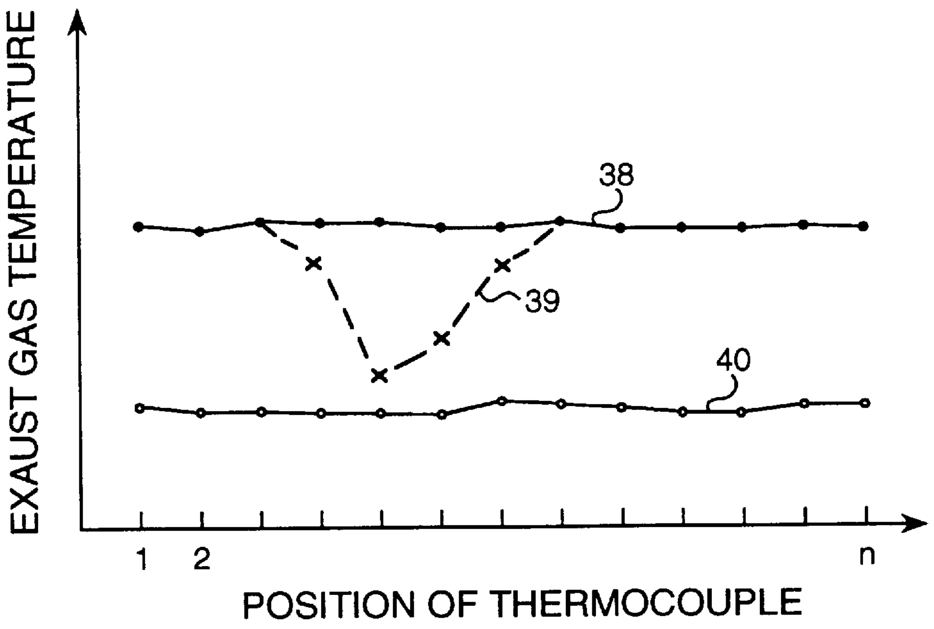
FIG. 10 is a graph representative of distribution of measured exhaust gas temperature.

Instead of the signals 1 of combustor metal temperature, signals 10 (FIG. 1) representative of exhaust gas temperature can be used. The exhaust gas temperature is measured by thermocouples 37 as exhaust gas temperature sensors provided in the gas turbine as shown in FIGS. 7 and 9, for instance.

Referring to FIG. 1, when the gas turbine is worked under simultaneous combustion in the first stage combustion section 28 and in the second stage combustion section 13 of each unit combustor 12, combustor metal temperature and a change 11 in the temperature (as shown in FIG. 2) which may be caused as time lapses, in each unit combustor 12 is monitored by the thermocouple 15. A signal 1 from the thermocouple 15 is inputted into a calculator 2. The calculator 2 calculates a change rate 3 of the monitored temperature as time lapses on the basis of the signal 1 to output the change rate 3 of temperature. The change rate 3 is inputted into a monitor relay 4 in which whether or not the change rate 3 exceeds a predetermined allowable limit is monitored. When a time for which the change rate is above the allowable limit is longer then a time set by a timer 5, that is, when the condition that the change rate is beyond the allowable limit continues after a period of time set by the timer 5, the unit combustor is assumed to be in abnormal combustion, a signal 6 is outputted from the timer 5 to an adder 7. This function is provided for each unit combustor (1, 2, . . . n).

The adder 7 inputs such a signal from each unit combustor which is assumed to be in abnormal combustion to calculate the number of such unit combustors assumed to be in abnormal combustion. A signal representative of the number of such unit combustors is transmitted to a monitor relay 8, in which whether or not the number exceeds an allowable limit number, for example, half or more of the number of all the unit combustors arranged for the gas turbine is monitored and when the number of unit combustors assumed to be in abnormal combustion exceeds the allowable limit number, simultaneous combustion in a plurality of the unit combustors is assumed to be unstable and a signal 9 is outputted. Namely, the signal 9 is an instruction to change the simultaneous combustion in the first stage combustion section 28 and in the second stage combustion section 13 to independent combustion in the first stage combustion section 13 only.

According to the instruction, the control unit 51 operates the fuel flow control valves 53 and 54 so that the fuel flow control valve 53 for premix combustion fuel flow is fully closed and the fuel flow valve 54 for diffusion combustion fuel flow is fully opened, whereby the premix combustion is stopped and only diffusion combustion is effected.

As mentioned above, exhaust gas temperature 10 can be used for monitoring combustion conditions, because a change of the exhaust gas temperature 10 at the time of unstable combustion has the same tendency as a change of combustor metal temperature 1.

Another control method is described hereunder, referring to FIG. 1.

When the gas turbine is worked under simultaneous combustion in the first stage combustion section 28 and in the second stage combustion section 13 of each unit combustor 12, a change 11 in combustor metal temperature (as shown in FIG. 2) which may be caused as time lapses, in each unit combustor 12 is monitored by the thermocouple 15. A signal 1 representative of temperature from the thermocouple 15 is inputted into the calculator 2. The calculator 2 calculates a change rate 3 of the monitored temperature as time lapses on the basis of the signal 1 to output the change rate 3 of temperature. The change rate 3 is inputted into the monitor relay 4 in which whether or not the change rate 3 exceeds a predetermined allowable limit is monitored. When the condition that the change rate is beyond the allowable limit continues after a period of time set by the timer 5, or when the temperature 1 is dropped to a level at which it is judged for abnormality such as misfire to occur, as compared with a combustor metal temperature at a time of steady state, the unit combustor is assumed to be in abnormal combustion, and a signal 6 is outputted to the adder 7. For abnormality judgement, there may be provided a circuit which judges whether or not the temperature 1 drops by a prescribed value of temperature after the abnormal combustion is judged on the basis of the above-mentioned change rate.

Alternatively, it can be constructed so that the signal 1 is inputted to the calculator 2 and at the same time to a circuit for judging temperature connected in parallel to the calculator 2, and when the change rate and the temperature drop exceed allowable limits, respectively, the combustion is judged to be abnormal. The above-mentioned combustor metal temperature at time of steady state can be a combustor metal temperature before passage of time set by the timer 5. Further, when the abnormality is judged by temperature, a temperature drop caused by the abnormality can be used. As an example, when the combustor running at a combustor metal temperature of 500°–600° C. is misfired, the temperature drops by 200°–300° C. to be about 300°–400° C. This temperature information can be used for abnormality judgement.

Another control method which controls the combustor not on the basis of the above-mentioned change rate, but on the basis of measured temperature is described hereunder, referring to FIG. 1.

In this method, the calculator 2 is omitted or is made so that a signal 1 or 10 passes through the calculator 2 without calculating a change rate.

When the gas turbine is worked under simultaneous combustion in the first stage combustion section 28 and in the second stage combustion section 13 of each unit combustor 12, a combustor metal temperature in each unit combustor 12 is monitored by the thermocouple 15. A temperature signal 1 from the thermocouple 15 is transmitted to the monitor relay 4 in which whether or not the temperature exceeds a predetermined allowable limit is monitored. When a time for which the temperature is above the allowable limit is longer than a time set by the timer 5, that is, when the condition that the temperature is beyond the allowable limit continues after a period of time set by the timer 5 (in case the temperature drops by a prescribed temperature value or more as compared with the combustor metal temperature at a time of steady state, etc.), the unit combustor is assumed to be in abnormal combustion, and a signal 6 is outputted from the timer 5 to an adder 7. The above-mentioned combustor metal temperature may be combustor metal temperature before lapse of the prescribed period of time by the timer 5. This function is provided for each unit combustor (1, 2, . . . n).

The adder 7 inputs such a signal from each unit combustor which is assumed to be in abnormal combustion to calculate the number of such unit combustors assumed to be in abnormal combustion. A signal representative of the number of unit combustors is transmitted to the monitor relay 8, in which whether or not the number exceeds an allowable limit number, for example, half or more of the number of all the unit combustors arranged for the gas turbine is monitored and when the number of unit combustors assumed to be in abnormal combustion exceeds the allowable limit number, simultaneous combustion in a plurality of the unit combustors is assumed to be unstable and a signal 9 is outputted. Namely, the signal 9 is an instruction to change the simultaneous combustion in the first stage combustion section 28 and in the second stage combustion section 13 to independent combustion in the first stage combustion section 13 only.

Figure 4:
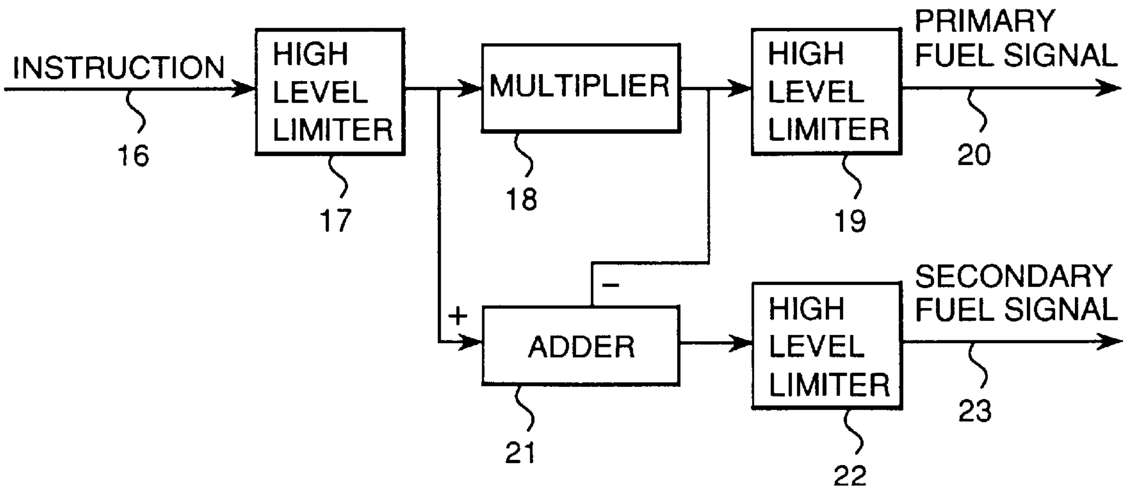
FIG. 4 is a block diagram of an embodiment of fuel sharing part in the control system according to the present invention.

A basic system of fuel gas flow distribution between a fuel flow for diffusion combustion and a fuel flow for premix combustion is described hereunder, referring to FIG. 4, concerning the stopping operation of premix combustion in the second stage combustion section 13.

A fuel instruction is outputted from the control unit 51 according to load demand. Sharing of fuel gas flow between fuel flow to the first stage combustion section and fuel flow to the second stage combustion section is decided by the fuel instruction.

Namely, a fuel instruction 16 of a total flow rate for the gas turbine demanded by gas turbine load is transmitted to a high level limiter 17 which restricts the flow rate not to exceed a set flow rate. The fuel instruction is transmitted from the high level limiter 17 to a multiplier 18 in which a fuel supply ratio between the first stage combustion section and the second stage combustion section is incorporated. The multiplier 18 multiples a fuel flow rate represented by the fuel instruction 16 by the fuel supply ratio to output a primary signal concerning a primary fuel signal. The primary signal is transmitted to a high level limiter 19 which restricts the flow rate not to exceed a set flow rate, whereby a primary fuel signal 20 is produced for the second stage combustion section. The primary fuel flow control valve is controlled by this primary fuel signal 20.

On the other hand, the secondary fuel signal for the secondary fuel flow control valve is produced as follows. The fuel instruction signal 16 from the high level limiter 17 is transmitted to an adder 21. The adder 21 also receives the above-mentioned primary signal concerning the primary fuel signal 20 from the multiplier 18. The adder 21 subtracts the primary signal from the fuel instruction signal 16 to output a secondary signal concerning a secondary fuel signal 23. The secondary signal is transmitted to a high level limiter 22 which restricts the flow rate not to exceed a set flow rate, whereby the secondary fuel signal 23 is produced for the second stage combustion section. The secondary fuel flow control valve is controlled by this secondary fuel signal 23.

If the fuel supply ratio is set 100%, the combustion in the second stage combustion section is stopped.

In this embodiment, the above-mentioned control method is employed, so that even when abnormal or unstable combustion occurs in lots of the unit combustors, the gas turbine can continue to operate under a stable condition by stopping the combustion in the second stage combustion section and effecting independent combustion in the first stage combustion section only. Further, changing the combustion in the second stage combustion section to the independent combustion can be effected smoothly.

Namely, when the combustion is changed to the independent combustion in the first stage combustion section only, NOx concentration increases temporarily as compared with combustion both in the first stage combustion region and in the second stage combustion section employing premix combustion, however, CO concentration decreases and the operation of the gas turbine can be continued while keeping stable combustion conditions of the independent combustion only in the first stage combustion section.

What is claimed is:

1. A control method of a gas turbine provided with a multi can type combustor comprising a plurality of unit combustors, each of which has a first stage combustion section for diffusion combustion and a second stage combustion section for premix combustion, characterized in that the combustion condition in said combustion sections is monitored to obtain monitored values and the combustion in said first and second stage combustion sections is changed to combustion only in said first stage combustion sections when a value representative of the combustion condition, obtained from the monitored values exceeds an allowable limit and the number of combustors which exceeds the allowable limit exceeds one-third or more to one-half or less of the total number of unit combustors.

2. A control method according to claim 1, wherein said value representative of the combustion condition is at least one of exhaust gas temperature and combustor metal temperature.

3. A control method of a gas turbine provided with a multi can type combustor comprising a plurality of unit combustors, each of which has a first stage combustion section for diffusion combustion and a second stage combustion section for premix combustion, characterized in that the combustion condition in said combustion sections is monitored to obtain monitored values and the combustion in said first and second stage combustion sections is changed to combustion only in said first stage combustion sections when a value representative of the combustion condition, obtained from the monitored values exceeds an allowable limit and the number of combustors which exceeds the allowable limit exceeds a predetermined number of unit combustors within the total number of unit combustors; and wherein said value representative of the combustion condition is a change rate over time of at least one of the exhaust gas temperature and the combustor metal temperature.

4. A control method of a gas turbine provided with a multi can type combustor comprising a plurality of unit combustors, each of which has a first stage combustion section for diffusion combustion and a second stare combustion section for premix combustion, characterized in that the combustion condition in said combustion sections is monitored to obtain monitored values and the combustion in said first and second stage combustion sections is changed to combustion only in said first stage combustion sections when a value representative of the combustion condition, obtained from the monitored values exceeds an allowable limit and the number of combustors which exceeds the allowable limit exceeds a predetermined number of unit combustors within the total number of unit combustors; and wherein said value representative of the combustion condition is a change rate over time of at least one of exhaust gas temperature and combustor metal temperature which is monitored continuously or periodically.

5. A control method of a gas turbine provided with a plurality of combustors, each of which has a first stage combustion section for diffusion combustion and a second stage combustion section for premix combustion, characterized in that at least one of exhaust gas temperature and combustor metal temperature in said second stage combustion section is monitored, and a change rate of the temperature is calculated from said monitored values and fuel supply to said second stage combustion section is stopped when said change rate exceeds an allowable limit.

6. A gas turbine apparatus provided with a multi can type combustor comprising a plurality of unit combustors, each of which has a first stage combustion section for diffusion combustion and a second stage combustion section for premix combustion, characterized in that at least one of an exhaust gas temperature detector and a combustor metal temperature detector is provided in each of said second stage combustion sections, and a controller is provided for calculating said change rate of temperature on the basis of signals from said detector and stopping fuel supply to said second stage combustion section when said change rate exceeds an allowable limit.

7. A gas turbine apparatus provided with a plurality of combustors, each of which has a first stage combustion section for diffusion combustion and a second stage combustion section for premix combustion, characterized in that at least one of an exhaust gas temperature detector and a combustor metal temperature detector is provided in each of said second stage combustion sections, and a controller is provided for calculating said change rate of temperature on the basis of signals from said detector and stopping fuel supply to said second stage combustion section when said change rate exceeds an allowable limit and the number of the combustors in each of which said change rate of temperature exceeds the allowable limit exceeds a prescribed number.

8. A gas turbine according to claim 7, wherein said number is half or more of the total number of said combustors provided in said gas turbine.

* * * * *